L. E. BAKER.
SPRING SEAT.
APPLICATION FILED JAN. 16, 1917.

1,254,963.

Patented Jan. 29, 1918.

WITNESSES
J. H. Crawford
Rodney M. Smith

INVENTOR
L. E. Baker,
BY Victor J. Evans
ATTORNEY

UNITED STATES PATENT OFFICE.

LEWIS E. BAKER, OF HUDSON, ILLINOIS.

SPRING-SEAT.

1,254,963.   Specification of Letters Patent.   Patented Jan. 29, 1918.

Application filed January 16, 1917.   Serial No. 142,688.

*To all whom it may concern:*

Be it known that I, LEWIS E. BAKER, a citizen of the United States, residing at Hudson, in the county of McLean and State of Illinois, have invented new and useful Improvements in Spring-Seats, of which the following is a specification.

This invention relates to spring seats, and more particularly to seats for agricultural implements, and the primary object of the invention is to provide such a seat which will guard the user against shocks and jars incident to work on rough ground.

Another and more specific object of the invention resides in the provision of a seat support including a beam pivotally mounted intermediate its ends and connected at its forward end to a spring member.

Another object of the invention resides in the provision of a seat of this nature of extremely simple and practical construction, which may be easily attached to agricultural implements, and which may be manufactured very cheaply.

With the above and other objects in view, the improvements reside in the construction, combination, and arrangement of parts set forth in the following specification and falling within the scope of the invention as claimed.

In the accompanying drawings:—

Figure 1:
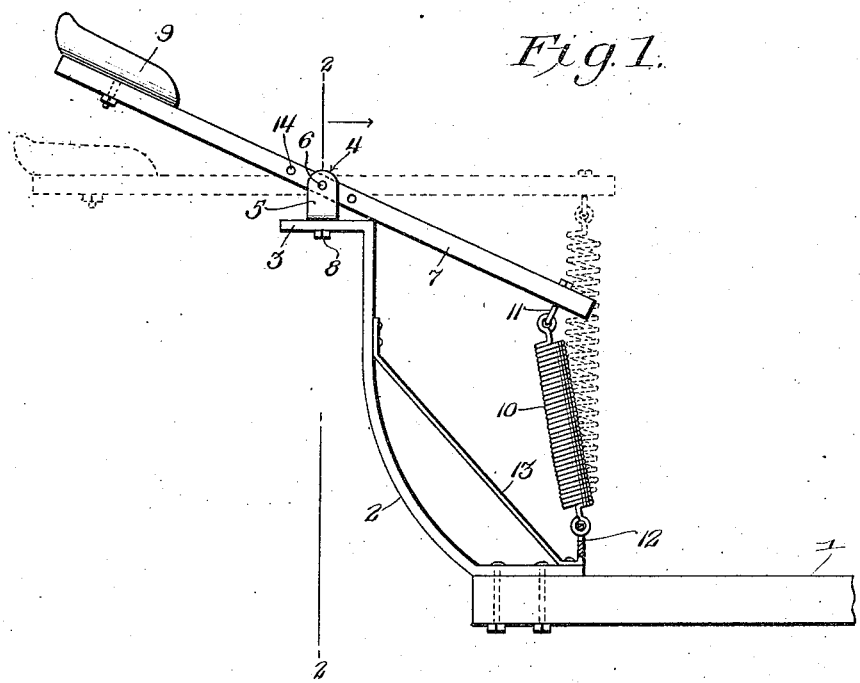
Figure 1 is a side elevation of the spring seat, showing by dotted lines the position of the seat when under load.
Figure 2:
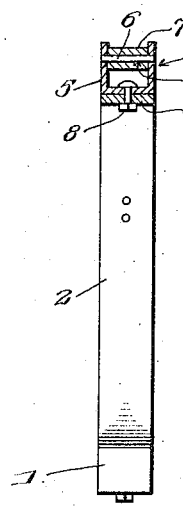
Fig. 2 is a sectional view on the plane of the line 2—2 of Fig. 1.

Referring in detail to the drawing by numerals, 1 designates an agricultural implement having my improved spring seat secured thereto. This seat includes a support 2, which may be riveted to the agricultural implement 1 as shown, or secured thereto in any preferred manner, and which curves rearwadly and upwardly as shown. The upper portion of the support is extended rearwardly to provide a flange 3, to which is pivotally secured a clevis 4, having spaced arms 5 between which is pivotally mounted by means of a pin 6 a beam 7. The clevis 4 is rotatably connected to the flange 3 by means of a loose rivet 8.

On the rear end of the beam is provided a seat 9, and to the forward end is connected a helical spring 10 by any suitable means such as the fastener 11. The lower end of this spring is hooked through an opening 12 in a brace 13. This brace is riveted to the support 2 adjacent its lower end and extends rearwardly and upwardly until it again engages the bar, at which point it is again riveted into permanent attachment therewith.

The beam 7 may be provided with a plurality of transverse openings 14, through any one of which the pin 6 may be passed, whereby an adjustment is provided which allows the leverage to be varied and consequently the pressure which is brought to bear upon the spring.

It will be apparent that most of the vibration occasioned by shocks and jars will be taken up by the spring 10, and not felt by the driver. The pivotal mounting of the clevis 4 by providing for a lateral movement of the seat 9, is a further aid to easy riding.

From the foregoing description, taken in connection with the accompanying drawing, it will be apparent that I have provided a very strong, simple, and practical spring seat, capable of use on various forms of agricultural implements, and designed to protect the user as far as possible from shocks and jars.

I claim:—

A spring seat including an upright having a lower portion to be secured to a structure, the upper end of the upright having a lateral extension, a clevis pivotally mounted on the lateral extension, a seat carrying beam pivotally mounted in the clevis for movement at right angles to the movement of the clevis on the upright, and a spring connected to the upright and to one end of the beam remote from the clevis.

In testimony whereof I affix my signature.

LEWIS E. BAKER.

Copies of this patent may be obtained for five cents each, by addressing the "Commissioner of Patents, Washington, D. C."